Patented Dec. 22, 1953

2,663,735

UNITED STATES PATENT OFFICE 2,663,735

PROCESS FOR PRODUCTION OF PHENOL AND KETONES BY DECOMPOSITION OF HYDROPEROXIDES

Leo J. Filar and Milton A. Taves, Wilmington, Del., assignors to Hercules Powder Company, Wilmington, Del., a corporation of Delaware No Drawing. Application December 30, 1949, Serial No. 136,162

11 Claims. (Cl. 260—593)

This invention relates to $a,a$-dialkylarylmethyl hydroperoxides, and more particularly to a process for the conversion of these hydroperoxides to phenols and aliphatic ketones.

There have been numerous processes developed for the purpose of producing phenols synthetically due to the fact that the demand for phenols, such as the cresols and phenol itself, far exceeds the amount which may be recovered in the refining of coal tar. Only a limited number of the processes for the preparation of phenol have proved sufficiently satisfactory to be applicable to commercial production. One of these involves the sulfonation of benzene and the formation of sodium benzene sulfonate which is fused with sodium hydroxide to produce sodium phenolate. The phenolate upon acidification yields phenol, which may be purified by distillation. However, probably the most widely used commercial process today for the preparation of phenol is that of hydrolyzing chlorobenzene with aqueous sodium hydroxide under conditions of high temperature and pressure to produce sodium phenolate, which then is acidified to give phenol. The chlorobenzene may be prepared either by direct chlorination of benzene or by chlorination with a mixture of hydrogen chloride and oxygen.

Even those processes which have been adapted to commercial production of phenol are not entirely satisfactory. They require large equipment investment and installation to provide facilities for the raw materials used, and they must be operated on the basis of large production capacity in order to produce phenol at a reasonable price. In addition, the processes are disadvantageous because of the many steps involved and the considerable problem of disposal of waste waters contaminated with phenol.

Now in accordance with this invention it has been found that phenols and aliphatic ketones may be prepared simply, efficiently, economically, and simultaneously from $a,a$-dialkylarylmethyl hydroperoxides by adding such a hydroperoxide to a homogeneous reaction medium comprising acetone and concentrated sulfuric acid, the concentration of the sulfuric acid in the reaction medium being from about 0.05 to about 10% by weight. In addition to producing phenols, the process at the same time produces aliphatic ketones as valuable products. This also is in contrast to previous processes for preparing phenols.

As an example of carrying out the process in accordance with this invention, $a,a$-dimethylbenzyl hydroperoxide is gradually added to a solution of acetone and about 1% by weight of concentrated sulfuric acid at a temperature of about 65° C., the rate of addition being so controlled that the decomposition proceeds rapidly and there is no build-up in the solution of a high concentration of the hydroperoxide. Upon completion of the reaction, the sulfuric acid in the reaction mixture is neutralized and the mixture then distilled to recover phenol. In the case of $a,a$-dimethylbenzyl hydroperoxide, the other product of the decomposition reaction is acetone, and the total acetone also may be recovered by the distillation step.

The following examples constitute specific illustrations of the embodiments of the invention generally outlined above. All amounts are based on parts by weight.

Example 1

A reaction vessel equipped with a stirrer, an inlet for the hydroperoxide, a thermometer, and a reflux condenser was charged with 1 part of concentrated sulfuric acid dissolved in 75 parts of acetone. The acid was commercial acid containing 95–96% sulfuric acid and having a specific gravity of 1.84. The acetone solution was heated to reflux (56° C.), the source of heat was removed, and there then was added slowly 225 parts of a cumene oxidate containing 83.7% $a,a$-dimethylbenzyl hydroperoxide. The addition of the hydroperoxide resulted in a vigorous, spontaneous refluxing of the solvent, the rate of which was easily controlled by the rate of addition of the hydroperoxide. During the 30-minute addition time, the temperature of the reaction mixture slowly rose to a maximum of 76° C. Upon completion of the reaction, the mixture was allowed to stand for an additional 30 minutes, after which there was added 4 parts of sodium bicarbonate. The reaction mixture then was distilled using both atmospheric and reduced pressures. At a temperature of 55°–55.8° C. under atmospheric pressure there was collected a fraction composed of 142.7 parts of acetone having a refractive index at 20° C. of 1.3598. The pressure then was reduced to 7 mm., and over a temperature range of 34°–70.5° C. there was collected a fraction composed of 20.8 parts and containing 4.8% phenol. The next fraction, collected at 70.5°–73.5° C. under a pressure of 7–8 mm., was composed of 110.5 parts of phenol assaying (U. S. P.) 99.1% phenol and 0.03% nonvolatiles. The distillation residue amounted to 18.1 parts, and there also was recovered from the distillation trap 7.5 parts of material. On the basis of this distillation the recovery of acetone was 97% of the theoretical, taking into account the amount of acetone used as solvent, and the yield of phenol was 96% of the theoretical. The theoretical yield in each instance was based on the amount of hydroperoxide used.

Example 2

Into the same apparatus described in Example 1 was charged a solution composed of 0.4 part of concentrated sulfuric acid in 54 parts of a solvent composed of 20% phenol and 80% acetone. This solution was heated to 60° C. and there then was added to the solution 185 parts of a cumene oxidate containing 88.4% $\alpha,\alpha$-dimethylbenzyl hydroperoxide. The addition was carried out over a period of about 20 minutes, the temperature being maintained in the range of 60°–64° C. by means of external cooling. At the end of this time the hydroperoxide was completely decomposed and the reaction mixture, after addition of 1.5 parts of sodium bicarbonate, was distilled under reduced pressure after removal of the acetone at atmospheric pressure. The first fraction under reduced pressure (12 mm.) boiled over a range of 55°–75° C. and amounted to 6.8 parts containing 22% phenol. The next fraction was collected at a temperature of 75°–78° C. under a pressure of 12 mm. and amounted to 96.8 parts of phenol assaying (U. S. P.) 99.9% phenol and 0.04% nonvolatiles. The last fraction, boiling at 78°–86° C. under 12 mm. pressure, amounted to 7 parts and contained 63% phenol. On the basis of this distillation the yield of phenol was 92% of the theoretical, taking into account the amount of phenol originally present as part of the solvent.

Example 3

The procedure of Example 2 was duplicated with the exceptions that the solvent was composed of 36% acetone and 64% phenol and that the period of addition of the hydroperoxide was 30 minutes at a temperature of 80°–85° C. Upon distillation, the first fraction collected under reduced pressure amounted to 4.7 parts and was obtained at a temperature of 62°–73° C. under a pressure of 10 mm. This fraction contained 60% phenol. The next fraction was collected at a temperature of 73°–76° C. under a pressure of 10–12 mm. and amounted to 117.2 parts of phenol assaying (U. S. P.) 96.2% phenol and 0.06% nonvolatiles. The final fraction was collected at a temperature of 76°–85° C. under a pressure of 10 mm. and amounted to 2.4 parts containing 94% phenol. The yield of phenol based on this distillation was 87.2% of the theoretical, taking into account the amount of phenol originally present as part of the solvent.

Example 4

The apparatus described in Example 1 was charged with a solution of 0.15 part of concentrated sulfuric acid in 52 parts of acetone. The solution was heated to reflux (56° C.) and to this solution was then added 185 parts of a p-cymene oxidate containing 84.2% $\alpha,\alpha$-dimethyl-p-methylbenzyl hydroperoxide. The addition was carried out over a period of 25 minutes and during this time the temperature of the reaction mixture rose from 56° to 75° C. Shortly thereafter the hydroperoxide was essentially completely decomposed. The sulfuric acid in the reaction mixture was neutralized by the addition of about 0.3 part of 35% aqueous sodium hydroxide and the mixture then was distilled. The acetone was removed at atmospheric pressure. At a temperature of 81°–96° C. under a pressure of 16 mm. there was collected a fraction of 6.9 parts containing 44% p-cresol. The next fraction was collected at 95°–97.5° C. under a pressure of 15–16 mm. and amounted to 71 parts containing 97% p-cresol. The final fraction was collected at a temperature of 95°–120° C. under a pressure of 14–15 mm. It amounted to 18.7 parts containing 62% p-cresol. The yield of p-cresol was 82.6% based on this distillation.

Example 5

In this example there was used an apparatus adapted for continuous operation. The reaction vessel in which the decomposition was carried out was equipped with a thermometer well, a mechanical stirrer, a condenser, an inlet for introduction of the hydroperoxide, an inlet for introduction of the sulfuric acid-acetone solution, and an outlet placed about one-third of the distance from the bottom of the reaction vessel for removal of the decomposition reaction mixture. At the beginning of the operation the reaction vessel was charged with a solution composed of acetone and 1% by weight, based on the acetone, of concentrated sulfuric acid. $\alpha,\alpha$-Dimethylbenzyl hydroperoxide then was introduced into the reaction vessel until the level of the reaction mixture was above that of the outlet. At this time the reaction mixture was allowed to flow from the vessel and acetone was recovered from the condenser, blended with additional sulfuric acid, and fed back to the reaction mixture. These individual operations were so adjusted that the recycled acetone containing make-up acid was introduced at the same rate as acetone was recovered from the condenser. The make-up acid was introduced at the rate of 1% based on the hydroperoxide feed and the reaction product was removed at the same rate as the hydroperoxide was introduced. By this procedure there was decomposed 3516 parts of a cumene oxidate containing 80.5% $\alpha,\alpha$-dimethylbenzyl hydroperoxide. The oxidate was introduced at a rate of 17.2 parts per minute. During the reaction the temperature of the mixture was 90° C., the contact time of the hydroperoxide was 26 minutes, and the effluent reaction product contained 0.5% of the hydroperoxide. Upon distillation of the product, there was recovered 1510 parts of solid phenol. This corresponded to a yield of phenol which was 86% of the theoretical.

Although the process of this invention has been set forth in the examples as applied to the hydroperoxides obtained from the oxidation of cumene and p-cymene, other $\alpha,\alpha$-dialkylarylmethyl hydroperoxides also are operable. Such hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. One method of preparing these hydroperoxides involves the liquid phase oxidation of the alkyl-substituted aromatic organic compounds having the above structural formula by passing an oxygen-containing gas through the compounds at a temperature between about 25° C. and about 95° C. in the presence of an aqueous alkali. The concentration of the aqueous alkali may be between about 0.01 and about 35%, although it is preferable to use concentrations of about 0.01 to about 2%. Vigorous agitation is desirable during the oxidation reaction. A preferred method of preparing the hydroperoxides, however, involves intimately contacting under anhydrous, non-catalytic conditions the alkyl-substituted aromatic organic compound in liquid phase with an oxygen-containing gas, such as air or molecular oxygen, in the presence of a peroxidic free radical oxidation initiator, such as an organic peroxide, hydroperoxide or compound capable of decomposing to form organic free radicals. In contrast to the method first discussed, the latter oxidation is carried out in the absence of an aqueous phase, and there is obtained a substantially anhydrous reaction product which is one of the more preferable hydroperoxide materials to use in the process of this invention.

The $\alpha,\alpha$-dialkylarylmethyl hydroperoxides which may be used in accordance with the process of this invention have the following structural formula

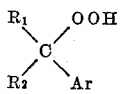

in which $R_1$ and $R_2$ represent alkyl groups, Ar represents a substituent selected from the group consisting of aryl and alkaryl groups, and the —OOH group represents a hydroperoxy group. As illustrative of the alkyl-substituted aromatic organic compounds which may be oxidized, p-cymene, cumene, diisopropylbenzene, sec-butylbenzene, p-ethylisopropylbenzene, and isopropylnaphthalene may be mentioned. These compounds lead to $\alpha,\alpha$-dimethyl-p-methylbenzyl, $\alpha,\alpha$-dimethylbenzyl, $\alpha,\alpha$-dimethyl-p-isopropylbenzyl, $\alpha,\alpha$-ethylmethylbenzyl, $\alpha,\alpha$-dimethyl-p-ethylbenzyl, and $\alpha,\alpha$-dimethylnaphthylmethyl hydroperoxides, respectively. Also, in the case of diisopropylbenzene and p-ethylisopropylbenzene it is possible to obtain dihydroperoxides. For example, $\alpha,\alpha,\alpha',\alpha'$-tetramethyl-p-xylene dihydroperoxide may be obtained from p-diisopropylbenzene. These compounds also may be named as aryl-(dialkyl)methyl hydroperoxides; for example, $\alpha,\alpha$-dimethylbenzyl hydroperoxide may be designated as phenyl(dimethyl)methyl hydroperoxide. The aryl and alkaryl groups need not be derived from benzene, as is the case in most of the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl, and the like to give alkaryl substituents, the same alkyl groups also being representative of $R_1$ and $R_2$ in the structural formula. $R_1$ and $R_2$ may be either the same or different. The oxidation of the alkyl-substituted aromatic organic compounds may be carried out upon the compounds themselves if they are liquids or upon solutions of the compounds if the latter are solids at the oxidation temperature.

In carrying out the decomposition process of this invention, several different modifications of the $\alpha,\alpha$-dialkylarylmethyl hydroperoxides may be used. The hydroperoxide may be utilized, for example, either in the form of the pure hydroperoxide or in the form of a crude oxidation reaction mixture containing the hydroperoxide. When the hydroperoxide is obtained by molecular oxygen oxidation, the oxidation usually is interrupted before all of the hydrocarbon has reacted in order to avoid or limit side reactions. The $\alpha,\alpha$-dialkylarylmethyl hydroperoxide then is obtained in mixture with smaller or larger amounts of the original hydrocarbon, which is an $\alpha,\alpha$-dialkylarylmethane, and the mixture also may contain small amounts of secondary reaction products such as the corresponding alcohols, which are $\alpha,\alpha$-dialkylarylmethyl alcohols. The oxidation of cumene, for example, leads to a reaction product containing $\alpha,\alpha$-dimethylbenzyl hydroperoxide, unchanged cumene and small amounts of $\alpha,\alpha$-dimethylbenzyl alcohol and acetophenone. However, by the preferred method of oxidation described previously the hydroperoxide may be obtained to the virtual exclusion of the alcohol and ketone secondary reaction products. Such reaction products may be used per se in the process of this invention.

It is preferable, however, to utilize the hydroperoxide in a more concentrated form, and a concentrate of the hydroperoxide may be obtained by separating the other constituents of the crude oxidation reaction mixture. The hydroperoxides may be separated from the oxidation reaction mixtures by, for example, fractional distillation at very low pressures, of the order of 0.01 to 1.0 mm. of mercury, the hydroperoxides having higher boiling points than the related hydrocarbon, alcohol and ketone. In some instances the hydroperoxides also may be separated from the oxidation reaction mixtures by crystallization, which may be facilitated by first distilling off at least part of the hydrocarbon. Another method of separating the hydroperoxides from the oxidation reaction mixture involves precipitation of the hydroperoxide with a concentrated aqueous solution (25 to 40%) of sodium hydroxide. The precipitate is crystalline. The precipitate of $\alpha,\alpha$-dimethylbenzyl hydroperoxide, for example, analyzes for the sodium salt of the hydroperoxide associated with four molecules of water.

The decomposition of the hydroperoxides in accordance with the process of this invention is carried out in a homogeneous reaction medium comprising acetone and between about 0.05 and about 10% by weight of concentrated sulfuric acid based on the reaction medium. The reaction medium must be homogeneous not only initially, but also throughout the reaction, in order to obtain the advantages of the process, for example, permissibility of using low concentrations of the concentrated sulfuric acid catalyst, and highly efficient contact between the catalyst and the hydroperoxide. The use of acetone in the reaction medium also is advantageous in that this low-boiling solvent dissipates most of the considerable heat of reaction through reflux. Furthermore, since the solvent of the reaction medium is generally composed of one or more of the decomposition reaction products, there is no complication from the presence of appreciable amounts of a foreign material in the separation and purification of the products.

The reaction medium should not contain too much water since the presence of considerable amounts of water will render the medium heterogeneous. The reaction medium soon after reaction has begun will contain acetone, the phenol corresponding to the hydroperoxide being decomposed, and some of the hydroperoxide itself.

Also present will be the sulfuric acid catalyst and, if the hydroperoxy group in the hydroperoxide is attached to the tertiary carbon atom of some group other than the isopropyl group, there will be present an aliphatic ketone other than acetone. The presence of too much water will alter the solubility characteristics of such a reaction medium and render it heterogeneous. For the purposes of this invention the medium must be maintained homogeneous, consequently it is highly desirable to carry out the reaction under substantially anhydrous conditions. By so doing there is insured a rapid reaction rate, ease of separation of the phenol product and elimination of the problem of disposal of waste waters contaminated with the phenol. Water may be tolerated in amounts above about 5% based on the weight of the total reaction medium as long as homogeneity is maintained, but it is preferable to keep the amount below about 5%. Desirably, less than about 2% should be present, and for optimum results water should be completely absent.

As pointed out above, the reaction medium after reaction has started will contain the phenol corresponding to the hydroperoxide being decomposed. Varying amounts of the phenol actually may be added to the reaction medium prior to beginning the reaction to serve as part of the solvent of the medium. Preferably, the phenol should correspond to the one being produced. Also, there may in some instances be used as a reaction medium the mixture of reaction products from a previous decomposition reaction. There may be used, for example, the mixture of products resulting from the decomposition of a hydroperoxide which will give acetone as one of the products. The mixture will contain acetone and the phenol corresponding to the hydroperoxide decomposed. If needed, sufficient concentrated sulfuric acid may be added to the mixture to bring the concentration of acid up to the desired level. It has been found that an amount of the phenol up to about 90% of the reaction medium may be used; however, it is more desirable not to exceed an amount corresponding to about 65%. For example, in the case of the decomposition of $\alpha,\alpha$-dimethylbenzyl hydroperoxide, the products are, in relative amounts, about 62% phenol and 38% acetone, and a mixture of these refluxes at a pot temperature of about 90° C. under atmospheric pressure. Under such conditions the acetone refluxes and acts to dissipate the heat of reaction, but amounts of phenol above about 65% result in elevation of the pot temperature to a point where the acetone no longer can act to dissipate the heat of reaction. Therefore, in general the amount of the phenol should not exceed the preferable value of about 65%. However, amounts of the phenol between about 65 and about 90% are operable at high temperatures or under reduced pressure, or both, the only disadvantage being that under these conditions the acetone also present does not act to dissipate the heat of reaction.

The addition of the hydroperoxide to the homogeneous reaction medium should be carried out at such a rate that the decomposition proceeds smoothly and there is no build-up of hydroperoxide in the reaction medium. The rate of addition will depend on the reactivity of the hydroperoxide, the concentration of the catalyst and the temperature. At lower catalyst concentrations and lower temperatures the decomposition reaction does not proceed as rapidly as at higher levels, consequently the hydroperoxide must be added more slowly to avoid a build-up of hydroperoxide concentration in the reaction medium and possible subsequent uncontrollable decomposition. In general, the ratio of hydroperoxide to the reaction medium should be kept as low as possible consistent with effecting the decomposition rapidly. The hydroperoxide may be added to the reaction medium either intermittently or continuously, and the process may generally be carried out either batchwise or continuously. In a continuous process part of the reaction medium is withdrawn concurrently with addition of the hydroperoxide and make-up acid catalyst and solvent.

As shown by the examples, the catalyst utilized in the process is concentrated sulfuric acid. The concentration of this catalyst in the reaction medium to which the hydroperoxide is added may be varied from about 0.05 to about 10% by weight. A preferable range of catalyst concentration is from about 0.1 to about 2% by weight, and a particularly useful amount is about 1% by weight. The concentrated sulfuric acid used will be an acid furnishing to the reaction medium between about 0.04 and about 8% $SO_3$ by weight, preferably between about 0.08 and about 1.6%, and most desirably about 0.8% $SO_3$ by weight. Efficient agitation may be utilized during the decomposition reaction but this is not essential due to the homogeneity of the reaction mixture. If used, such agitation may be obtained through use of mechanical stirrers or by passing a stream of a gas, such as air, through the reaction mixture.

The temperature which may be used during the decomposition reaction may be varied rather widely, depending upon the reactivity of the hydroperoxide and concentration of the catalyst. Generally, however, the temperature may be varied from about 0° to about 100° C. At the lower temperatures the reaction may be somewhat slow if the concentration of the sulfuric acid catalyst is low, but higher concentrations of the catalyst increase the rate of reaction considerably. A preferable temperature range is between about 30° and about 90° C., and a highly desirable range is between about 50° and about 75° C.

The examples have shown the decomposition reaction as being carried out at atmospheric pressure, but it is apparent that the reaction also may be carried out either under reduced pressure or under superatmospheric pressure. A broad range of pressure conditions is possible in effecting the decomposition reaction, in other words, but from the standpoint of practicality, the reaction preferably is carried out at atmospheric pressure.

It is apparent that the process of this invention has many outstanding advantages over previous processes for the preparation of phenols. Many of these already have been set forth. In addition, there is the advantage of it not being necessary to use expensive, complicated equipment. Also, the decomposition may be carried out under substantially anhydrous conditions, and preferably is effected in this manner. This is in direct contrast to the aqueous systems which necessarily must be used when phenol is obtained by the hydrolysis of, for example, chlorobenzene or benzene sulfonate. In those processes involving such a hydrolysis, the aqueous phase necessarily is contaminated with phenol and there therefore exists a large problem in plants operating such processes for the disposal of the phenol-contaminated waste water, since the presence of phenol in water generally is undesirable, as when the water later may be utilized for drinking purposes.

The advantages of the present process, particularly in so far as elimination of the presence of phenol-contaminated waste water is concerned, may be better seen from the overall standpoint of converting benzene to phenol. One of the overall processes involved in this invention comprises the alkylation of benzene with propylene to obtain cumene, oxidation of the cumene under anhydrous conditions and in the absence of catalysts to obtain α,α-dimethylbenzyl hydroperoxide, decomposition of this hydroperoxide in accordance with the process of this invention to give phenol and acetone as products, and separation of the phenol and acetone from the reaction mixture. In none of the steps involving the oxidation and decomposition is it necessary to have water present, consequently, the problem of disposing phenol-contaminated waste water is eliminated. A further advantage of the overall process is that the combination of the oxidation and decomposition steps may be made continuous. The oxidation, for example, may be carried out in one reactor, the oxidation reaction mixture distilled to obtain a concentrated hydroperoxide, and the concentrated hydroperoxide then transferred directly to the reactor in which the decomposition reaction is effected.

The process in accordance with this invention represents a more economical and efficient means for obtaining not only phenol itself but also other phenolic compounds such as p-cresol and hydroquinone. The latter two compounds are, of course, obtained by the decomposition of α,α-dimethyl-p-methylbenzyl hydroperoxide and α,α,α',α'-tetramethyl-p-xylylene dihydroperoxide, respectively. Due to the simple nature of the process, the latter will be found particularly applicable to small scale installations and will not require the vast outlay of capital and equipment required by previous processes.

What we claim and desire to protect by Letters Patent is:

1. The process of producing a phenol and an aliphatic ketone by decomposition of an α,α-dialkylarylmethyl hydroperoxide which comprises adding said hydroperoxide to a homogeneous reaction medium comprising acetone and concentrated sulfuric acid, the concentration of said acid in said medium being between about 0.05 and about 10% by weight and any water present being in an amount less than that required to render the reaction medium heterogeneous.

2. The process of producing a phenol and an aliphatic ketone by decomposition of an α,α-dialkylarylmethyl hydroperoxide which comprises adding said hydroperoxide to a homogeneous reaction medium comprising acetone and concentrated sulfuric acid, the concentration of said acid in said medium being between about 0.1 and about 2% by weight and any water present being in an amount less than that required to render the reaction medium heterogeneous.

3. The process of producing a phenol and an aliphatic ketone by decomposition of an α,α-dialkylarylmethyl hydroperoxide which comprises adding said hydroperoxide to a homogeneous reaction medium comprising acetone and concentrated sulfuric acid at a temperature between about 0° and about 100° C., the concentration of said acid in said medium being between about 0.05 and about 10% by weight and any water present being in an amount less than that required to render the reaction medium heterogeneous.

4. The process of producing a phenol and an aliphatic ketone by decomposition of an α,α-dialkylarylmethyl hydroperoxide which comprises adding said hydroperoxide to a homogeneous reaction medium comprising acetone and concentrated sulfuric acid at a temperature between about 30° and about 90° C., the concentration of said acid in said medium being between about 0.05 and about 10% by weight and any water present being in an amount less than that required to render the reaction medium heterogeneous.

5. The process of producing a phenol and an aliphatic ketone by decomposition of an α,α-dialkylarylmethyl hydroperoxide which comprises adding said hydroperoxide to a homogeneous reaction medium comprising acetone and concentrated sulfuric acid, the concentration of said acid in said medium being between about 0.05 and about 10% by weight and any water present being in an amount less than that required to render the reaction medium heterogeneous, and separating a phenol and an aliphatic ketone from the reaction mixture.

6. The process of producing phenol and acetone by decomposition of α,α-dimethylbenzyl hydroperoxide which comprises adding said hydroperoxide to a homogeneous reaction medium comprising acetone and concentrated sulfuric acid, the concentration of said acid in said medium being between about 0.05 and about 10% by weight and any water present being in an amount less than that required to render the reaction medium heterogeneous.

7. The process of producing phenol and acetone by decomposition of α,α-dimethylbenzyl hydroperoxide which comprises adding said hydroperoxide to a homogeneous reaction medium comprising acetone and concentrated sulfuric acid at a temperature between about 30° and about 90° C., the concentration of said acid in said medium being between about 0.1 and about 2% by weight and any water present being in an amount less than that required to render the reaction medium heterogeneous, and separating phenol and acetone from the reaction mixture.

8. The process of producing p-cresol and acetone by decomposition of α,α-dimethyl-p-methylbenzyl hydroperoxide which comprises adding said hydroperoxide to a homogeneous reaction medium comprising acetone and concentrated sulfuric acid, the concentration of said acid in said medium being between about 0.05 and about 10% by weight and any water present being in an amount less than that required to render the reaction medium heterogeneous.

9. The process of producing hydroquinone and acetone by decomposition of α,α,α',α'-tetramethyl-p-xylylene dihydroperoxide which comprises adding said dihydroperoxide to a homogeneous reaction medium comprising acetone and concentrated sulfuric acid, the concentration of said acid in said medium being between about 0.05 and about 10% by weight and any water present being in an amount less than that required to render the reaction medium heterogeneous.

10. The process of producing a phenol and an aliphatic ketone by decomposition of an α,α-dialkylarylmethyl hydroperoxide which comprises adding said hydroperoxide to a homogeneous reaction medium comprising acetone, a phenol and concentrated sulfuric acid, the concentration of said acid in said medium being between about 0.05 and about 10% by weight and any water present being in an amount less than that required to render the reaction medium heterogeneous.

11. The process of producing phenol and acetone by decomposition of α,α-dimethylbenzyl hydroperoxide which comprises adding said hydroperoxide to a homogeneous reaction medium comprising acetone, phenol and concentrated sulfuric acid, the concentration of said acid in said medium being between about 0.05 and about 10% by weight and any water present being in an amount less than that required to render the reaction medium heterogeneous.

LEO J. FILAR.
MILTON A. TAVES.

References Cited in the file of this patent

FOREIGN PATENTS

| Number | Country | Date |
|---|---|---|
| 629,429 | Great Britain | Sept. 20, 1949 |

OTHER REFERENCES

Hock et al., Berichte, vol. 77, pages 257–264 (1944).